United States Patent [19]

Merlini et al.

[11] 4,452,208
[45] Jun. 5, 1984

[54] MODULAR MULTI-CYLINDER INTERNAL COMBUSTION ENGINE WITH SUPERCHARGING

[75] Inventors: Luigi Merlini; Aldo Bassi; Giuseppe Satta, all of Milan, Italy

[73] Assignee: Alfa Romeo Auto S.p.A., Naples, Italy

[21] Appl. No.: 469,684

[22] Filed: Feb. 25, 1983

[30] Foreign Application Priority Data

Feb. 26, 1982 [IT] Italy .................... 19884 A/82

[51] Int. Cl.³ .............................................. F02B 11/02
[52] U.S. Cl. ................... 123/481; 123/198 F; 123/559
[58] Field of Search ........... 123/481, 198 F, DIG. 7, 123/559

[56] References Cited

U.S. PATENT DOCUMENTS

| | | | |
|---|---|---|---|
| 3,121,422 | 2/1964 | Baker | 123/198 F |
| 3,270,724 | 9/1966 | Dolza | 123/198 F |
| 3,902,472 | 9/1975 | Baugelin | 123/198 F |
| 3,941,113 | 3/1976 | Baguelin | 123/198 F |
| 4,191,152 | 3/1980 | Deutschmann | 123/198 F |
| 4,248,198 | 2/1981 | Deutschmann | 123/198 F |

Primary Examiner—Ronald B. Cox
Attorney, Agent, or Firm—Charles E. Brown

[57] ABSTRACT

The invention relates to a multi-cylinder Otto cycle internal combustion engine for motor vehicles, of the type in which the number of working cylinders varies with the power delivered, and in which the working cylinders for any power condition have a compression ratio which is greater than the compression ratio of the complementary cylinders, these latter being supercharged.

10 Claims, 3 Drawing Figures

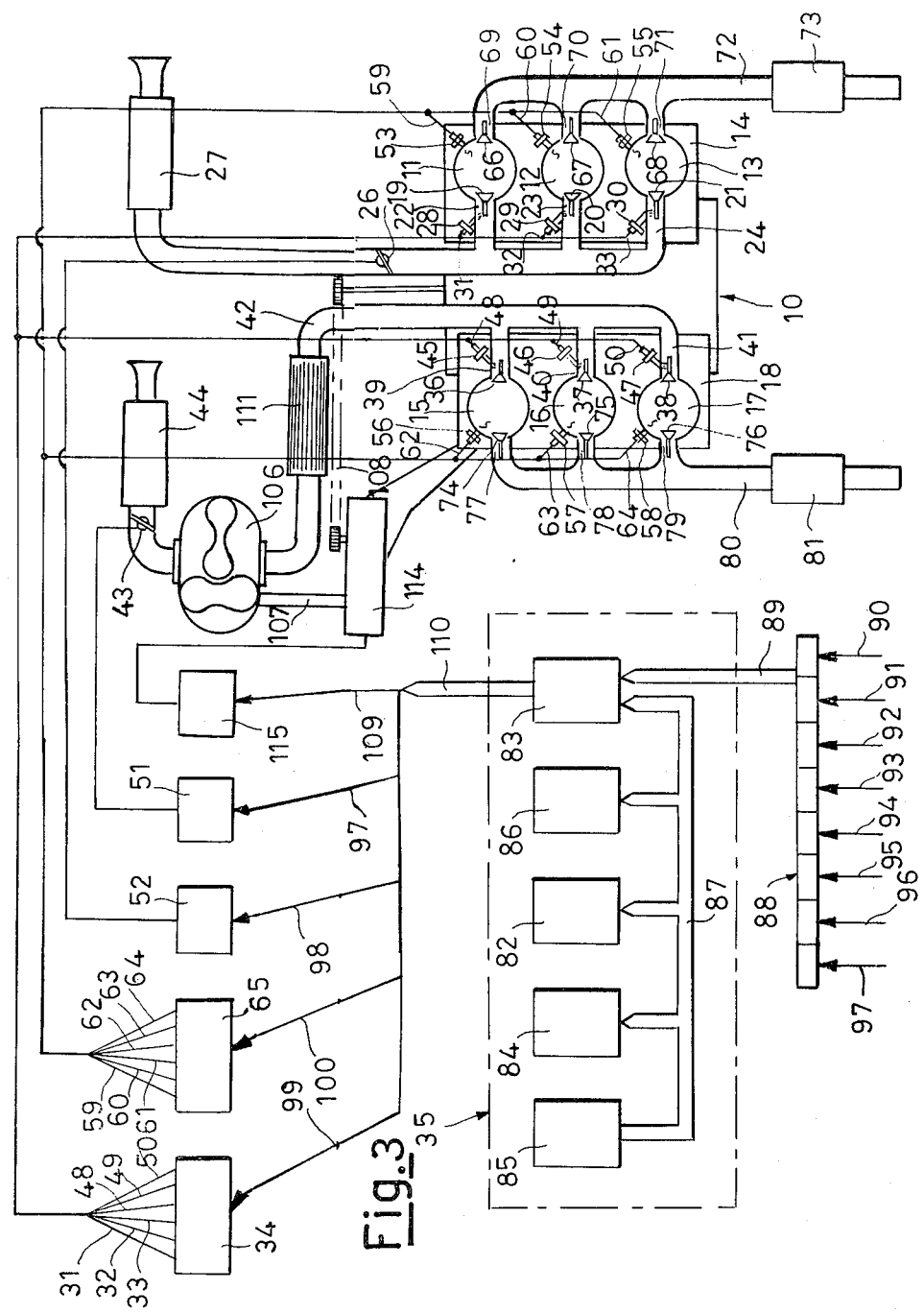

MODULAR MULTI-CYLINDER INTERNAL COMBUSTION ENGINE WITH SUPERCHARGING

This invention relates to a multi-cylinder Otto cycle internal combustion engine for motor vehicles, of the so-called modular type, i.e. able to operate with a number of working cylinders which varies with the power to be delivered.

Of the measures adopted by internal combustion engine manufacturers to reduce fuel consumption, especially at low power usage, it has proved particularly advantageous to control the number of working cylinders as a function of the power to be delivered.

If a number of working cylinders can be used which varies with the power requirement, the engine can be operated under higher efficiency conditions because improved cylinder filling and a reduction in the pumping work can be attained, leading to higher useful work per cycle. The result is a reduction in the specific fuel consumption which, although varying in extent according to the system used for deactivating the cylinders, is still considerable even if deactivating is effected merely by shutting off the fuel supply to the inactive cylinders.

In order to reduce fuel consumption there is also the known tendency to construct engines with increasingly greater compression ratios. However, the danger of detonation, especially at high loads, imposes limits on the compression ratio increase.

On the other hand, in motor vehicles of the medium-high class it is desirable to have available engines which perform well, especially under those conditions in which high power availability or torque is required.

For this purpose a solution has been sought which would enable consistent fuel savings to be attained under modest engine power requirements, but which would ensure excellent performance under high engine power requirements.

This is attained by a modular engine in which a first group of working cylinders, designed to deliver a proportion of the maximum power obtainable from the engine, has a high geometrical compression ratio exceeding 12.5:1, whereas a second group of working cylinders, designed to deliver the complementary proportion of the maximum power obtainable from the engine, has a geometrical compression ratio less than that of the first group of cylinders, and having a maximum value of 9.5:1, and in addition is supercharged, so that the effective operating compression ratio is such as to ensure the optimum compromise between performance and margin with respect to detonation.

More specifically, the cylinders of the first group, characterised by a high compression ratio, are caused to operate alone, between minimum and maximum load, when under those conditions in which the engine is required to operate at modest power and up to power values pertaining to a prechosen limiting curve; consequently under these conditions, which can correspond to vehicle town use, maximum fuel saving is attained, and a sufficient margin with respect to detonation can be maintained by a suitable choice of spark advance.

In contrast, under those conditions in which power greater than that of said limiting curve is used, and up to values pertaining to the engine maximum power curve, the second group of cylinders is also made to operate, this group being supercharged; under these conditions, the engine is able to provide excellent performance with regard to speed, pickup and acceleration.

In a preferred embodiment, the engine according to the invention is characterised by comprising a first group of cylinders having a high geometrical compression ratio exceeding 12.5:1, and a second group of cylinders having a geometrical compression ratio with a maximum value of 9.5:1, the first group of cylinders being connected to a first mixture feed system provided with first mixture throttle means, the second group of cylinders being connected to a second mixture feed system provided with second mixture throttle means, the feed system of the second group of cylinders being also provided with supercharging means and with mixture shut-off means, said first and second mixture throttle means being operated by respective first and second actuators, means for controlling actuation being operationally connected to said first and second actuators, to said supercharging means and to said mixture shut-off means in order to cause said first mixture throttle means to meter the mixture feed to said first group of cylinders and to cause said mixture shut-off means to interrupt feed to the second group of cylinders for predetermined values of prechosen engine parameters and for required engine powers less than the values pertaining to a prechosen limiting curve, and in order to cause said mixture shut-off means to restore mixture feed to the second group of cylinders, to cause said supercharging means to increase the feed pressure of the feed system of the second group of cylinders up to a predetermined value, and to cause said first and second mixture throttle means to meter the feed to the respective group of cylinders for further predetermined values of said prechosen engine parameters and for power requirements greater than those of said limiting curve, up to values pertaining to the engine maximum power curve.

Characteristics and advantages of the invention will be more apparent from an examination of the accompanying FIGS. 1, 2 and 3, which show two preferred embodiments of the invention by way of non-limiting examples in which:

FIG. 3 is a diagrammatical view similar to FIG. 1 of a modified internal combustion engine formed in accordance with this invention.

Figure 1:
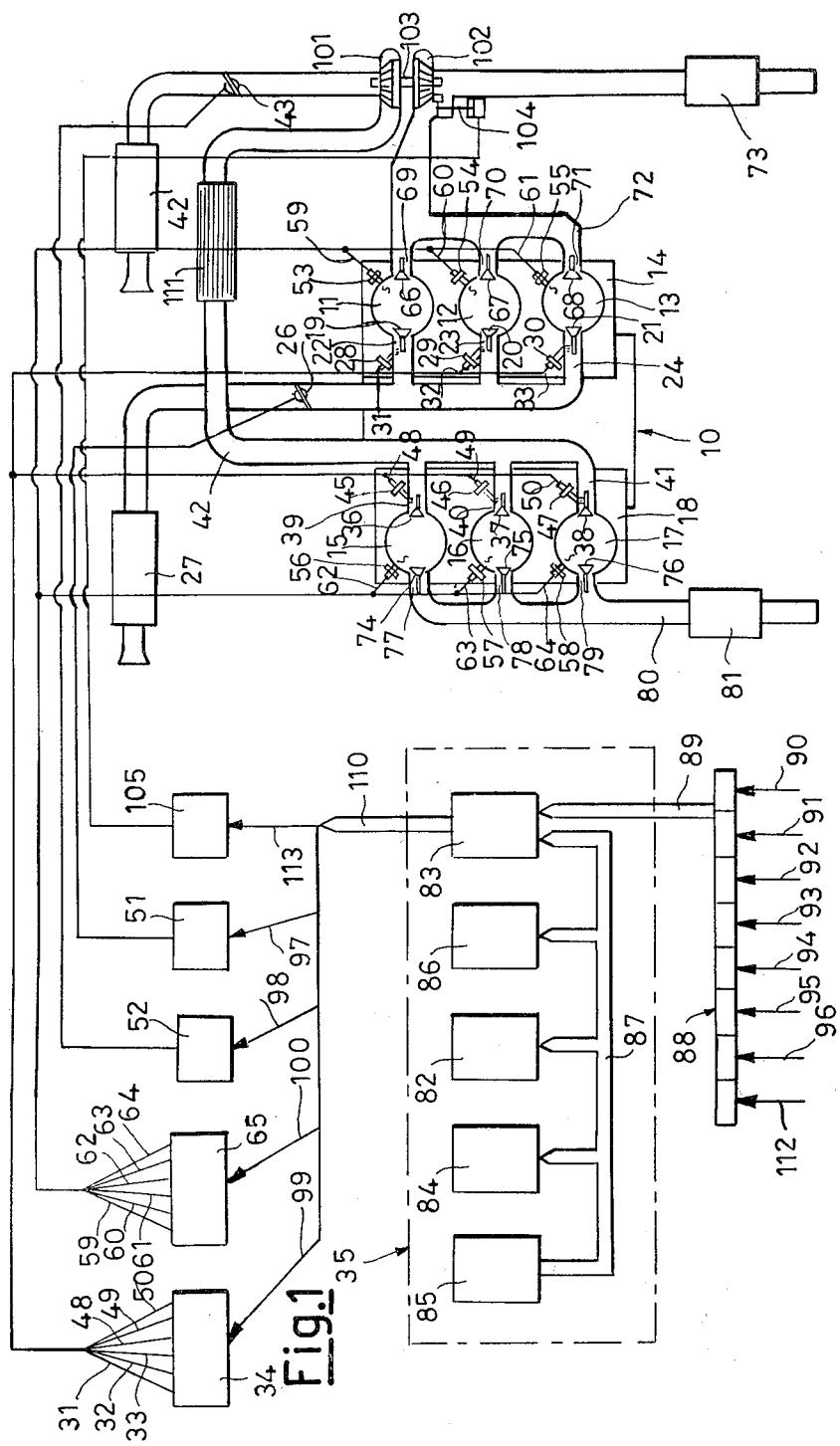
FIG. 1 is a diagrammatical view showing an internal combustion engine constructed in accordance with the invention and the controls therefor.

FIG. 1 shows diagrammatically an internal combustion engine indicated overall by the numeral 10, and which in this particular case is provided with six cylinders disposed in the form of a 60° "V". The reference numerals 11, 12, 13 indicate the three cylinders of the right hand bank indicated by the numeral 14, these three cylinders having a geometrical compression ratio of high value, for example between 13:1 and 15:1. The reference numerals 15, 16, 17 indicate the three cylinders of the left hand bank indicated by the numeral 18. These latter three cylinders have a geometrical compression ratio of between 8:1 and 9:1.

The reference numerals 19, 20, 21 indicate the intake valves of the cylinders 11, 12, 13, and the reference numerals 22, 23, 24 indicate the relative intake ducts which extend from the manifold 25. The reference numeral 26 indicates the throttle valve for the air drawn through the manifold 25, and the numeral 27 indicates the relative filter.

In this particular case the engine is fed by petrol injection, and each intake duct is provided with an electrically operated injector 28, 29, 30 respectively, which are actuated by way of the conductors 31, 32, 33 from the injection power stage, diagrammatically indicated by the block 34, which is operationally connected to the engine control device, of microcomputer type, indicated overall by the numeral 35.

The reference numerals 36, 37, 38 indicate the intake valves of the cylinders 15, 16, 17, and the reference numerals 39, 40, 41 indicate the relative intake ducts which extend from the manifold 42.

Upstream of the manifold 42 there is disposed a centrifugal compressor 101, the purpose of which is to increase the feed pressure of the intake air to the cylinders 15, 16, 17. The reference numeral 111 indicates a cooler for the engine feed air.

The reference numeral 43 indicates the throttle valve for the air drawn through the manifold 42, and the numeral 44 indicates the relative filter.

The reference numerals 45, 46, 47 indicate the electrically operated injectors which deliver petrol to the cylinders 15, 16, 17, and are also actuated by way of the conductors 48, 49, 50 from the power stage 34, which is operationally connected to the control device 35.

The throttle valves 26 and 43 are operationally connected to respective actuators 51, 52, which can be of hydraulic, pneumatic, electrical or mixed type, and are indicated diagrammatically by the blocks 51, 52 because they are of known type. The actuators 51 and 52 are also controlled by the control device 35, as described hereinafter.

The reference numerals 53, 54, 55, 56, 57, 58 indicate the spark plugs of the six engine cylinders. The spark plugs are connected by respective conductors 59, 60, 61, 62, 63, 64 to the block 65, which comprises the ignition power stage, the ignition coil, and the distributor for distributing high voltage to the spark plugs, the block being operationally connected to the control device 35.

The exhaust valves of the cylinders 11, 12, 13 are indicated by 66, 67, 68, while the reference numerals 69, 70, 71 indicate the exhaust ducts which join into the manifold 72, which is provided with the radial turbine 102 having a shaft 103 which drives the centrifugal compressor 101, is further provided with the by-pass valve 104 for the turbine 102, and is also fitted with the silencer 73.

the exhaust valves of the cylinders 15, 16, 17 are indicated by 74, 75, 76, and the reference numerals 77, 78, 79 indicate the exhaust ducts which join into the manifold 80 fitted with the silencer 81.

The control device 35 is constituted by a microcomputer comprising a central microprocessor unit (CPU) 82, an input and output unit 83, a random access memory (RAM) 84, a read-only memory (ROM) 85, and a timer unit 86.

The reference numeral 87 indicates the parallel interconnection line (bus) for the addresses, data and control.

The control device or input signals to the microcomputer 35 relate to the following engine parameters transmitted by appropriate sensors (not shown because of known type): engine rotational speed and timing angle with respect to a prechosen reference, represented by the arrow 90; angle of the throttle valve 26, represented by the arrow 91; angle of the throttle valve 43, represented by the arrow 92; temperature of the engine intake air, represented by the arrow 93; temperature of the engine cooling fluid, represented by the arrow 94, any abnormal combustion due to the effects of detonation, represented by the arrow 95, and overpressure in the manifold 42, represented by the arrow 104.

The microcomputer 35 also receives from suitable sensors a signal constituted by the position of the accelerator pedal, which represents an indication of the power required of the engine, and is represented by the arrow 96, and a signal indicating the pressure in the manifold 42 and represented by the arrow 112.

The reference numeral 88 indicates overall the analogue/digital transducers for the signals entering the microcomputer, and the signal input line into the microcomputer is indicated by 89.

The read-only memory (ROM) 85 contains the calculation programmes of the central microprocessor unit (CPU) 82, the engine carburation programme data, i.e. the quantity of petrol to be injected at each cycle into the working cylinders as a function of prechosen engine parameters (engine r.p.m., feed throttle valve angle, feed pressure, intake air temperature, and temperature of the engine cooling fluid), and also the data relative to the engine operating programme based on the values assumed by prechosen engine parameters, and on the required power. In this respect, for modest power requirements up to values pertaining to a prechosen limiting curve, only the three cylinders 11, 12, 13 are active and thus only the electrically operated injectors 28, 29, 30 are opened. For power requirements greater than those of the said limiting curve, all six cylinders are active and thus all six electrically operated injectors 28–30 and 45–47 are opened.

Figure 2:
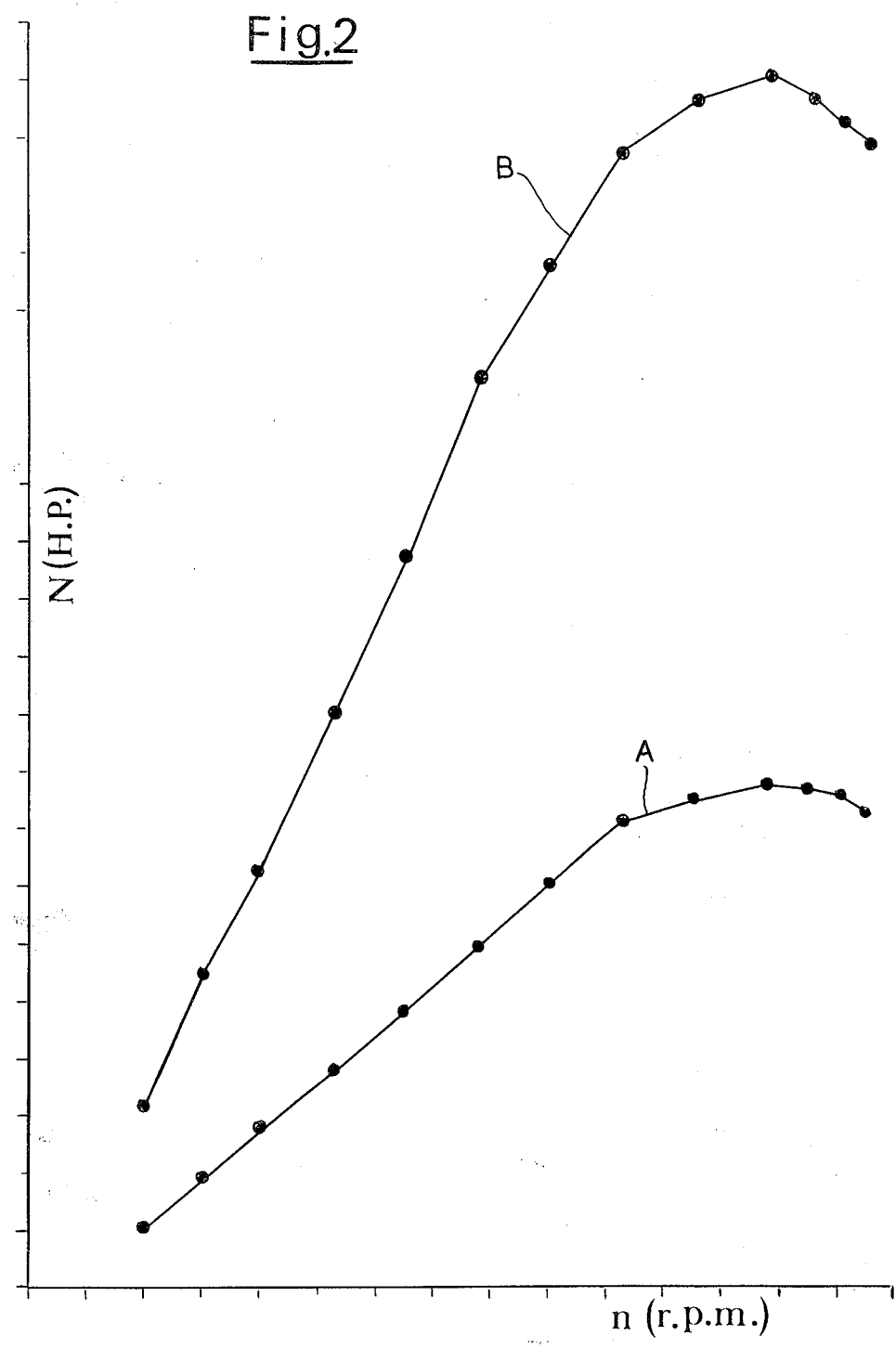
FIG. 2 is a graph of the power deliveed by the engine of FIG. 1 as a function of the engine rotational speed.

In this respect, FIG. 2 shows a graph of the power delivered by the engine of FIG. 1 as a function of the engine rotational speed. Said limiting curve is indicated by A, and the maximum power curve is indicated by B.

The memory 85 also contains the data constituted by the allowable limiting value for the overpressure in the manifold 42.

The memory 85 further contains the data of the programme regarding ignition advance relative to the T.D.C. as a function of prechosen engine parameters (engine r.p.m., throttle valve angles, temperature of the engine cooling fluid, and possible detonation signal), and also contains the actuation programme data for the throttle valve 26 and 43, i.e. the angular positions which they are to assume as a function of the power required of the engine, as represented by the position of the accelerator pedal, and as a function of the instantaneous engine operating conditions. In this respect, for modest power requirements up to the values pertaining to the limiting curve A of FIG. 2, only the cylinders 11–13 are active, and only the throttle valve 26 is made to operate between minimum and maximum load. In this case, if the value 43 is kept open, the compressor 101 compresses the air fed by the manifold 42, as the turbine 102 is traversed by the exhaust gas of the working cylinders 11–13. The pressurized air which reaches the inactive cylinders 15–18 prevents oil leakage through the rings of the cylinders, helps to reduce their cooling requirements, and reduces the power lost due to their operation.

For power requirements exceeding those of said limiting curve A and up to values pertaining to the engine maximum power curve B of FIG. 2, all the cylinders 11–13 and 15–17 are active, and the throttle valve 43 is made to operate together with the throttle valve 26.

In this case the cylinders 15–17 are supercharged by the compressor 101, and the degree of supercharge depends on the throughput of exhaust gas traversing the turbine 102. If the overpressure in the manifold 42 exceeds a given limiting value, the microcomputer 35 causes the actuator 105 to control the by-pass valve 104 so that it deviates part of the exhaust gas from the turbine 102, in accordance with the control signal represented by the arrow 113.

Thus, for power requirements exceeding those of said limiting curve but less than full power, the two banks of cylinders 14 and 18 each provide a proportion of the total required power, and the two proportions are divided between the two banks by controlling the simultaneous opening of the two valves 26 and 43 and regulating the supercharging pressure in the manifold 42. For example, the valve 43 can be opened completely, whereas the valve 26 is regulated between minimum and maximum opening.

The signals leaving the microcomputer through the output line 110 comprise the control signal for positioning the valve 26, represented by the arrow 97 and fed to the actuator 51; the control signal for positioning the valve 43, represented by the arrow 98 and fed to the actuator 52; the control signal for opening the electrically operated injectors, represented by the arrow 99 and fed to the power stage 34; the control signal for igniting the spark plugs, represented by the arrow 100 and fed to the power stage 65; and the control signal for the by-pass valve 104 (arrow 113).

The control signals for positioning the valves 26 and 43 are processed by the microcomputer 35 on the basis of the instantaneous engine operating conditions and the position of the accelerator pedal, according to the various rules memorised in the memory 85.

The microcomputer calculates the opening time of the electrically operated injectors as a function of the quantity of petrol to be injected per cycle, as memorised in the memory 85, on the basis of the measured engine parameters, and by means of the timers of the unit 86 it controls the opening of those electrically operated injectors which are to be activated, either three, namely 28-30, or six, namely 28-30 and 45-47, according to the combustion order of the cylinders, for example as described in the U.S. Pat. No. 4,346,443 granted on Aug. 24, 1982.

The microcomputer calculates the moment of ignition of the spark plugs as a function of the advance angles memorised in the memory 85 on the basis of the measured engine parameters, and by means of the timers of the unit 86 it controls the ignition of the spark plugs in accordance with the order of combustion of the cylinders, for example as described in the U.S. Patent application Ser. No. 183,586 filed on Sept. 2, 1980.

FIG. 3 shows a modified embodiment of the engine of FIG. 1, all common elements being represented by the same reference numerals.

In this case, upstream of the feed manifold 42 there is disposed a positive displacement blower indicated by 106 and driven mechanically by the engine 10 by way of the shaft 107 and transmission 108.

The transmission 108 is provided with an electromagnetic clutch 114 which is controlled by the microcomputer 35, by way of the signal represented by the arrow 109 and the actuator 115, in such a manner that it connects the blower to the engine only under certain operating conditions, for example for predetermined values of the engine r.p.m. and/or for given positions of the accelerator pedal.

We claim:

1. A multi-cylinder Otto cycle internal combustion engine for motor vehicles having manual adjustment means for controlling the power required of said engine, said engine having a feed arrangement for an air and petrol mixture, said feed arrangement comprising mixture throttle means, supercharging means and mixture feed shut-off means operationally connected to actuator feed means and to means for controlling actuation as a function of prechosen engine parameters and of the power required of the engine, the engine being also provided with an exhaust system for the gaseous products of combustion, and with an ignition system comprising spark plugs operationally connected to actuator means and to means for controlling the actuation of said spark plugs as a function of prechosen engine parameters, the engine being also provided with sensors for said engine parameters, and with measuring devices for measuring the operating conditions of said manual adjustment means and operationally connected to said means for controlling the actuation of said throttle means, of said mixture feed shut-off means, of the supercharging means and of the spark plugs, said engine being characterised by comprising a first group of cylinders having a high geometrical compression ratio with a value exceeding 12.5:1, and a second group of cylinders having a geometrical compression ratio with a maximum value of 9.5:1, the first group of cylinders being connected to a first mixture feed system provided with a first of said mixture throttle means, the second group of cylinders being connected to a second mixture feed system provided with a second of said mixture throttle means, the feed system of the second group of cylinders being also provided with said supercharging means and with said mixture feed shut-off means, said first and second mixture throttle means being operated by respective first and second actuators, said actuation control means being operationally connected to said first and second actuators, to said supercharging means and to said mixture feed shut-off means in order to cause said first mixture throttle means to meter the mixture feed to said first group of cylinders to cause said mixture feed shut-off means to interrupt mixture feed to the second group of cylinders for predetermined values of prechosen engine parameters and for required engine powers less than the values pertaining to a prechosen limiting curve, and in order to cause said mixture feed shut-off means to restore mixture feed to the second group of cylinders, to cause said supercharging means to increase the feed pressure of the mixture feed system of the second group of cylinders up to a predetermined value, and to cause said first and second mixture throttle means to meter the mixture feed to the respective groups of cylinders for further predetermined values of said prechosen engine parameters and for power requirements greater than those of said limiting curve, up to the values pertaining to the engine maximum power curve.

2. An engine as claimed in claim 1, characterised in that said first and second feed systems are each constituted by a manifold for feeding cylinder intake air said manifold having a throttle valve for said air and individual feed ducts provided with electrically operated injectors, the throttle valve of a first of said feed manifolds being connected to said first actuators, the throttle valve of a second of said feed manifolds being connected to said second actuators, the electrically operated injectors of the two groups of cylinders being operationally connected to third actuators, and the electrically operated injectors of the second group of cylinders being operationally connected to said mixture feed shut-off means in order to be caused by said actuation control means to interrupt petrol injection to said second group of cylinders for engine power requirements less than the values pertaining to said limiting curve.

3. An engine as claimed in claim 1, characterised in that said actuation control means are constituted by a programmed microcomputer fed with the signals constituted by prechosen engine parameters emitted by said sensors and the signal indicating the power requirement of the engine emitted by said manual adjustment means, the microcomputer being provided with a central microprocessor unit (CPU), a random access memory (RAM), a timer unit, and a second read-only memory (ROM) containing the calculation programmes of said central microprocessor unit, the data of the programme relating to the actuation of said throttle valves between minimum and maximum opening as a function of prechosen engine parameters and as a function of the power required of the engine, the data of the engine carburation programme, i.e. the quantity of petrol to be injected at each cycle into the working cylinders as a function of prechosen engine parameters, the data of the manner of operating the engine based on the values assumed by prechosen engine parameters and based on the power required of the engine, the item of data representing the allowable limiting value for the overpressure in the feed manifold of the second group of cylinders, and the data of the programme relating to ignition advance relative to the T.D.C. as a function of prechosen engine parameters, said microcomputer being programmed in order to calculate the control signals for said first and second actuators of the throttle valves as a function of the signal originating from said manual power adjustment means, as a function of the signals originating from the engine parameter sensors and as a function of the valve actuation programme data contained in said read-only memory, and to further calculate the signals for controlling the opening of said electrically operated injectors as a function of the signals originating from said engine parameter sensors and as a function of the carburation programme data contained in said read-only memory, to calculate the control signals for shutting-off the electrically operated injectors of the second group of cylinders as a function of the signals originating from said engine parameters, as a function of the signal originating from said power adjustment means and as a function of the engine mode of operation data contained in said read-only memory, and to further calculate the signals for controlling the spark plug ignition as a function of the signals originating from said engine parameter sensors and as a function of the ignition advance programme data contained in said read-only memory, the microcomputer being also programmed to feed said calculated control signals to said first and second throttle valve actuators, to said shut-off means for the electrically operated injectors of the second group of cylinders, and by way of said timers to said third actuators of the electrically operated injectors, in accordance with the cylinder combustion order, and to said spark plug actuator means in accordance with the cylinder combustion order.

4. An engine as claimed in claim 1, characterised in that the first group of cylinders is connected to a first exhaust system for the gaseous products of combustion, and the second group of cylinders is connected to a second exhaust system for the gaseous products of combusion, said supercharging means being constituted by at least one turbocompressor, of which the turbine is disposed in said first exhaust system together with a by-pass valve for said turbine, and of which the compressor is disposed in said feed manifold for the second group of cylinders, said by-pass valve being operable to deviate part of the exhaust gas from the turbine when the overpressure in the manifold of the second group of cylinders is equal to said predetermined limiting value.

5. An engine as claimed in claim 1, characterised in that said supercharging means are constituted by a positive displacement blower disposed in said feed manifold of the second group of cylinders, said blower being driven by the engine, by way of disengageable clutch means operable to connect the blower to the engine for predetermined values of the engine r.p.m. and/or for given positions of said manual adjustment means.

6. An engine as claimed in claim 2, characterized in that said actuation control means are constituted by a programmed microcomputer fed with the signals constituted by prechosen engine parameters emitted by said sensors and the signal indicating the power requirement of the engine emitted by said manual adjustment means, the microcomputer being provided with a central microprocessor unit (CPU), a random access memory (RAM), a timer unit, and a second read-only memory (ROM) containing the calculation programmes of said central microprocessor unit, the data of the programme relating to the actuation of said throttle valves between minimum and maximum opening as a function of prechosen engine parameters and as a function of the power required of the engine, the data of the engine carburation programme, i.e. the quantity of petrol to be injected at each cycle into the working cylinders as a function of prechosen engine parameters, the data of the manner of operating the engine based on the values assumed by prechosen engine parameters and based on the power required of the engine, the item of data representing the allowable limiting value for the overpressure in the feed manifold of the second group of cylinders, and the data of the programme relating to ignition advance relative to the T.D.C. as a function of prechosen engine parameters, said microcomputer being programmed in order to calculate the control signals for said first and second actuators of the throttle valves as a function of the signal originating from said manual power adjustment means, as a function of the signals originating from the engine parameter sensors and as a function of the valve actuation programme data contained in said read-only memory, and to further calculate the signals for controlling the opening of said electrically operated injectors as a function of the signals originating from said engine parameter sensors and as a function of the carburation programme data contained in said read-only memory, to calculate the control signals for shutting-off the electrically operated injectors of the second group of cylinders as a function of the signals originating from said engine parameters, as a function of the signal originating from said power adjustment means and as a function of the engine mode of operation data contained in said read-only memory, and to further calculate the signals for controlling the spark plug ignition as a function of the signals originating from said engine parameter sensors and as a function of the ignition advance programme data contained in said read-only memory, the microcomputer being also programmed to feed said calculated control signals to said first and second throttle valve actuators, to said shut-off means for the electrically operated injectors of the second group of cylinders, and by way of said timers to said third actuators of the electrically operated injectors, in accordance with the cylinder combustion order, and to said spark plug actuator means in accordance with the cylinder combustion order.

7. An engine as claimed in claim 2, characterised in that the first group of cylinders is connected to a first exhaust system for the gaseous products of combustion, and the second group of cylinders is connected to a second exhaust system for the gaseous products of combusion, said supercharging means being constituted by at least one turbocompressor, of which the turbine is disposed in said first exhaust system together with a by-pass valve for said turbine, and of which the compressor is disposed in said feed manifold for the second group of cylinders, said by-pass valve being operable to deviate part of the exhaust gas from the turbine when the overpressure in the manifold of the second group of cylinders is equal to said predetermined limiting value.

8. An engine as claimed in claim 3, characterised in that the first group of cylinders is connected to a first exhaust system for the gaseous products of combustion, and the second group of cylinders is connected to a second exhaust system for the gaseous products of combustion, said supercharging means being constituted by at least one turbocompressor, of which the turbine is disposed in said first exhaust system together with a by-pass valve for said turbine, and of which the compressor is disposed in said feed manifold for the second group of cylinders, said by-pass valve being operationally connected to said microcomputer in order to be made to deviate part of the exhaust gas from the turbine when the overpressure in the manifold of the second group of cylinders is equal to said predetermined limiting value.

9. An engine as claimed in claim 2, characterised in that said supercharging means are constituted by a positive displacement blower disposed in said feed manifold of the second group of cylinders, said blower being driven by the engine by way of disengageable clutch means operable to connect the blower to the engine for predetermined values of the engine r.p.m. and/or for given positions of said manual adjustment means.

10. An engine as claimed in claim 3, characterised in that said supercharging means are constituted by a positive displacement blower disposed in said feed manifold of the second group of cylinders, said blower being driven by the engine by way of disengageable clutch means which are operationally connected to said microcomputer in order to be made to connect the blower to the engine for predetermined values of the engine r.p.m. and/or for given positions of said manual adjustment means.

* * * * *